Aug. 24, 1937.　　　　　D. A. MEEKER　　　　　2,090,634
FOOD HANDLING APPARATUS
Filed Aug. 13, 1934　　　　　5 Sheets-Sheet 3

INVENTOR
David A. Meeker
BY
Marechal & Noe
ATTORNEYS

Aug. 24, 1937.   D. A. MEEKER   2,090,634
FOOD HANDLING APPARATUS
Filed Aug. 13, 1934   5 Sheets-Sheet 4
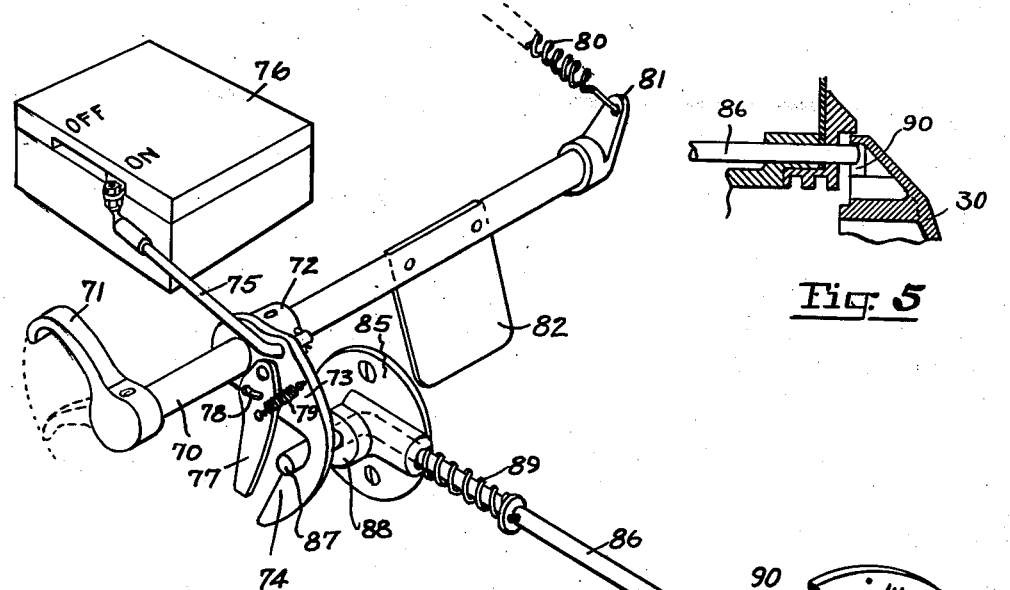
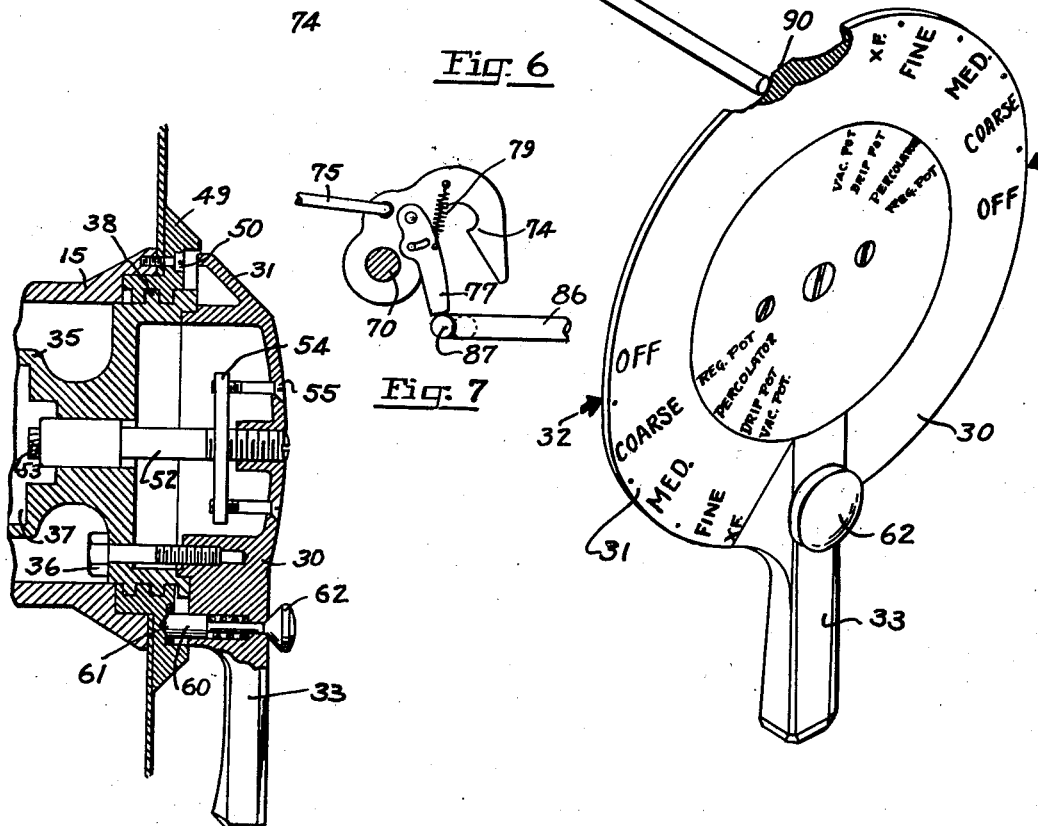
INVENTOR
David A. Meeker
BY
Marechal & Noe
ATTORNEYS Aug. 24, 1937.   D. A. MEEKER   2,090,634
FOOD HANDLING APPARATUS
Filed Aug. 13, 1934   5 Sheets-Sheet 5
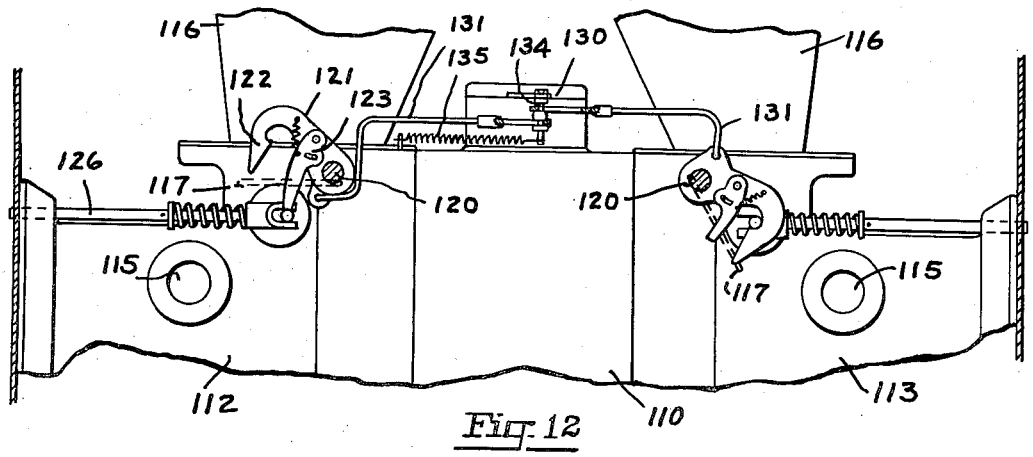
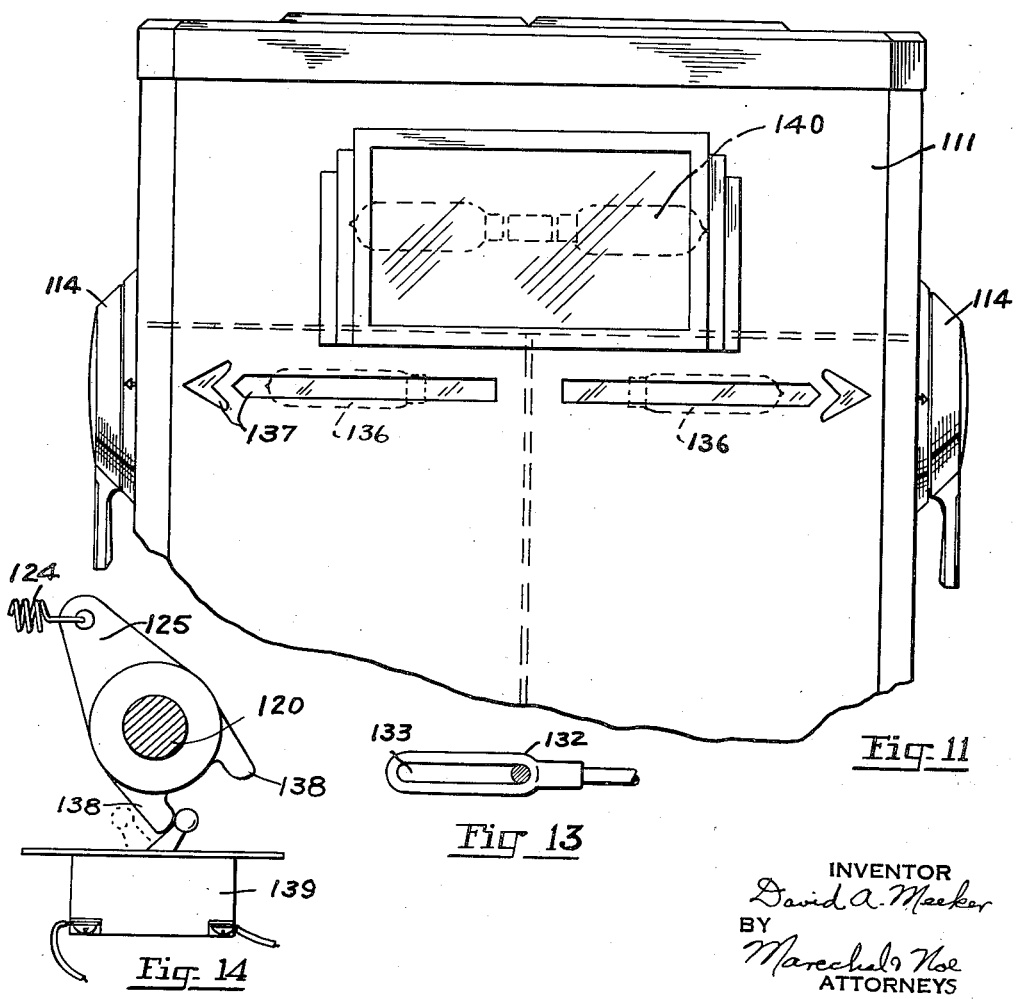

Patented Aug. 24, 1937

2,090,634

UNITED STATES PATENT OFFICE 2,090,634

FOOD HANDLING APPARATUS

David A. Meeker, Troy, Ohio, assignor to The Hobart Manufacturing Company, Troy, Ohio, a corporation of Ohio Application August 13, 1934, Serial No. 739,603

5 Claims. (Cl. 83—18)

This invention relates to food handling apparatus and more particularly to coffee mills.

Several different methods of making coffee are known and in general use and in order to secure the most satisfactory results in each case, it is desirable that the coffee be ground to a predetermined degree of fineness. For example, coffee should be quite coarsely ground for use in the open pot method, and should be more finely ground for the drip and the like methods. Coffee mills as used in retail stores have been provided with means for regulating the grade or fineness of the grind, but it has been rather customary, particularly during rush periods, for a series of customers' orders to be filled without adjusting the setting of the coffee mill. Thus the coffee is not ground with the proper characteristics for the particular customer's use.

Accordingly it is the principal object of the present invention to provide a coffee mill adapted to grind coffee to a plurality of different grades of fineness, and requiring a selection of a predetermined grade for each grinding operation of the mill. Selection of a predetermined grade being required, it is a matter of no more difficulty to select the grade desired by each individual customer.

It is a further object to provide a coffee mill of this character having an interlock connection between the grade selector and the motor control means requiring the operation of the grade selector to a predetermined grinding position as a condition precedent to the operation of the motor.

It is a further object to provide a simple and compact coffee mill which is adapted to grind the coffee in predetermined uniform condition into a receptacle.

It is a further object to provide a coffee mill having a burr casing removable from the mill as a unit for purposes of cleaning or repair and the like.

It is a further object to provide a double ended mill in which provision is made requiring operation of a grade selector at either end of the mill to a predetermined grinding position as a condition precedent to grinding at that end of the mill.

Other objects and advantages will be apparent from the description, the accompanying drawings and the appended claims.

In the drawings,—

Fig. 4 is a vertical sectional view through the grade selector mechanism;

Fig. 5 is a detail sectional view of the grade selector mechanism;

Fig. 6 is a view in perspective showing the interlock mechanism between the grade selector and the motor control member;

Fig. 7 is a detail elevational view of the interlock mechanism;

Fig. 8 is a partial horizontal sectional view on the line 8—8 of Fig. 2;

Fig. 11 is a broken side elevational view of the double ended mill from the customer's side thereof;

Fig. 12 is an elevational view showing the interlocking mechanism;

Fig. 13 is a detailed view of the switch operating link; and

Fig. 14 is a sectional view showing the control for the light source for each end of the mill.

Figure 1:
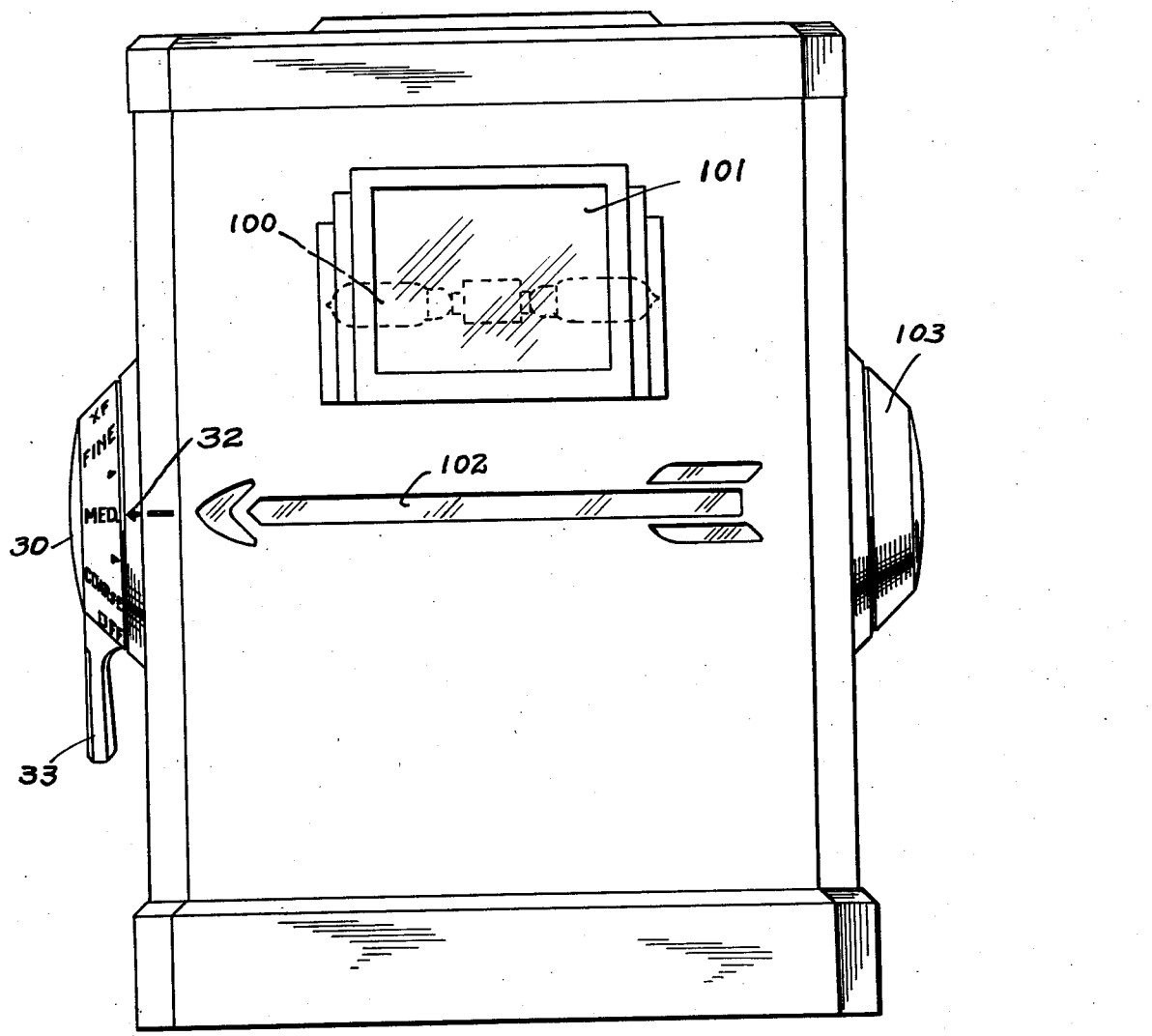
Fig. 1 is a side elevational view of a coffee mill constructed in accordance with the present invention from the customer's side of the mill.
Figure 2:
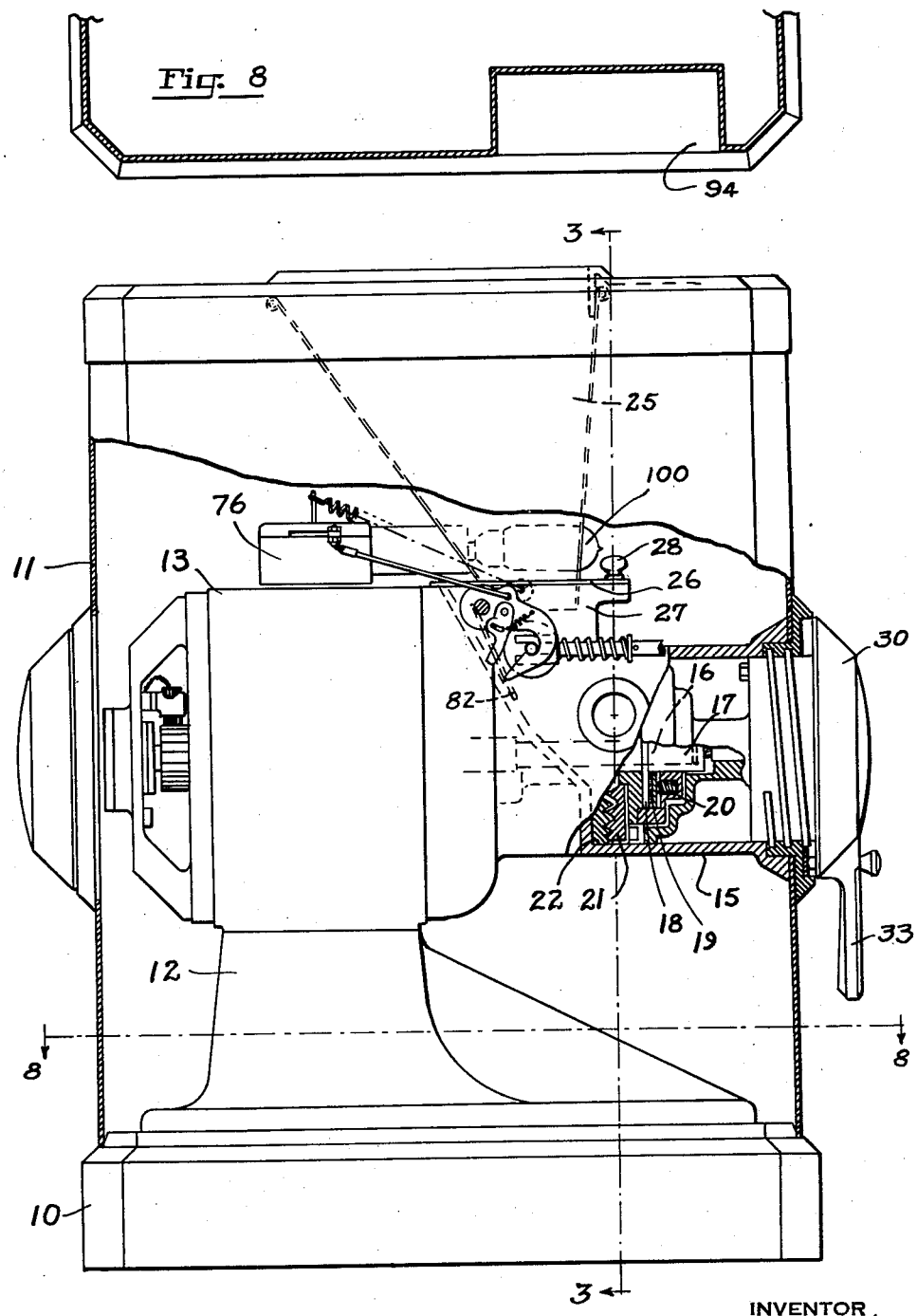
Fig. 2 is a view in side elevation of the mill, parts of the mill being broken away to show the construction thereof.
Figure 3:
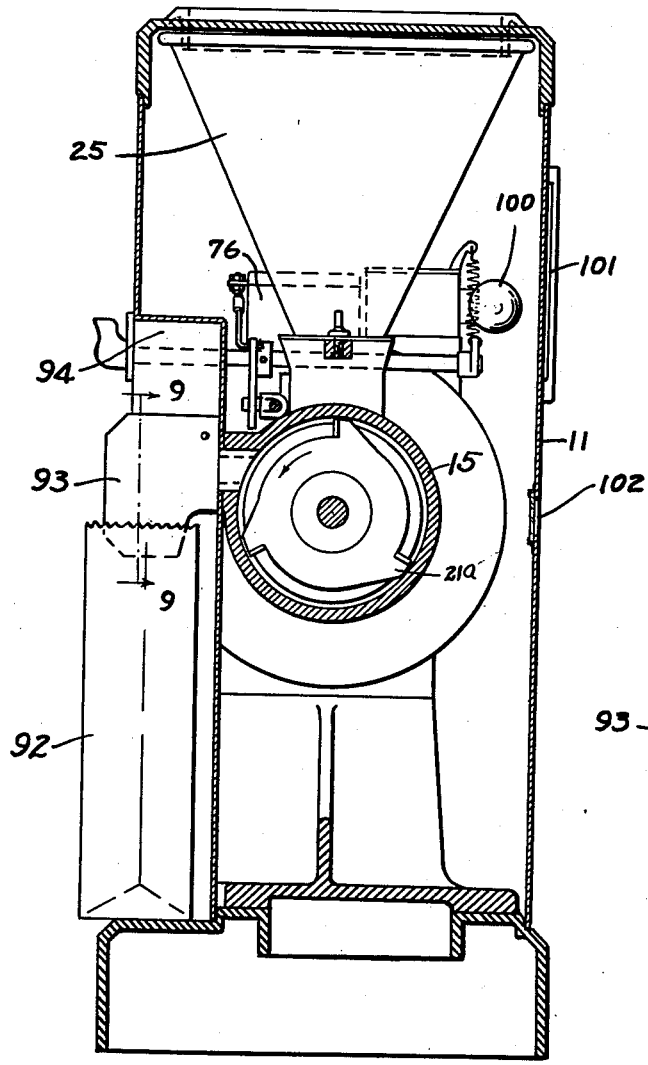
Fig. 3 is a vertical sectional view on the line 3—3 of Fig. 2.
Figure 9:
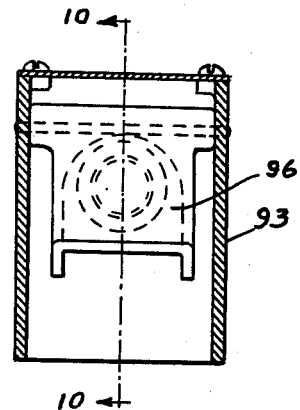
Fig. 9 is a vertical sectional view of the discharge outlet on the line 9—9 of Fig. 3.
Figure 10:
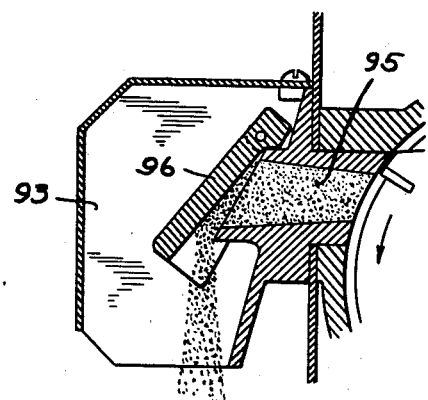
Fig. 10 is a vertical sectional view on the line 10—10 of Fig. 9.

Referring to the drawings which disclose a preferred embodiment of the invention, there is shown at 10 a base member adapted to support a casing or housing section 11 substantially rectangular in cross section. Within the housing 11 and supported upon the base 10 is motor pedestal 12 supporting electric driving motor 13. The motor supports a projecting grinder or burr casing 15, extending laterally from one end of the motor. The motor shaft 16 extends in overhanging relation into the burr casing and on it is slidably keyed a hub 17 carrying a friction disk 18. A cooperating friction disk 19, spring pressed toward disk 18, is carried upon a member 20 rotatably mounted on hub 17, and carrying the rotatable burr 21. A burr 22 fixed to the casing cooperates with burr 21 to form the grinding means. Rotatable burr 21 is thus adjustable axially of the motor shaft to vary the spacing of the burrs and consequently the grade or the fineness of the grind, and the friction drive provides a safety link to prevent damage to the mill in case of jamming of the burrs, etc.

A removable hopper 25 is positioned in the housing 11 with its top opening in position to receive coffee in bean form preparatory to being ground. The hopper is substantially funnel shaped as shown, and is provided with a flange 26 adapted to rest upon a bracket 27 fastened to the motor frame. The hopper may be supported in any convenient manner, as for instance by a pin and slot connection, to the bracket 27 with a locking screw 28 as shown. With such construction the hopper can be readily withdrawn and removed from the coffee mill when desired.

A grade selector means is provided for adjusting the degree of fineness to which the coffee is to be ground. This grade selector mechanism comprises a disk 30 having beveled lateral edges 31 bearing index marks for the position of the selector. The disk preferably carries two series of the marks and two fixed indices 32 are provided, thus making it possible for the customer on the one side of the mill and the operator on the other to both read the setting of the grade selector member. The disk 30 is provided with a depending operating handle 33 for rotating the same.

The disk is attached to a guide member 35 by means of a plurality of bolts 36. The guide member is formed with suitable recesses 37 for receiving the rotatable parts of the grinding mechanism. Member 35 is also provided with an external spiral thread 38 adapted to fit within a cooperating spiral groove formed in ring 49 fixed to the burr casing 15 by means of screws 50.

The disk and the member 35 also carry an adjusting arm 52 provided with an engaging portion 53 adapted to engage the end of hub 17 to adjust the same axially to thereby control the degree of fineness of the grind. Member 52 is threaded into the disk 30 to provide for zero adjustment thereof, and a locking means comprising a bar 54 threaded upon member 52, and adapted to be placed under tension by means of a pair of screws 55 serves to maintain the member 52 in any predetermined adjusted position.

As will be evident, upon the rotation of the disk 30 by means of handle 33, the guide member 35 and adjusting arm 52 will be caused to move axially to vary the spacing of burrs 21, 22, and thereby adjustable to vary the grade selected. A latch mechanism is also preferably provided to retain the grade selector means in any predetermined adjusted position, this means comprising a spring pressed plunger 60 carried in the disk 30, and adapted to seat in any one of a plurality of depressions 61 formed in ring 49. An operating knob 62 extends to the outer face of the disk. The construction is preferably such that the grade selector may be moved to any predetermined grade position by means of handle 33, the plunger snapping into the several depressions to hold the selector in any desired position.

In accordance with the present invention the grade selector is so constructed that it can be completely removed from the burr casing as a unit in a very simple manner. Stop means (not shown) are preferably provided to limit the normal movement of handle 33 to the off position, but are so arranged that the knob 62 may be manually withdrawn to clear the stop member and to permit unscrewing of the grade selector means for complete removal thereof from the mill.

Means are provided in the present invention requiring the operator, as a condition precedent to starting the operation of the mill, to operate the grade selector to a predetermined grinding position. Means are also provided for preventing the deenergization of the motor until the grade selector has been returned to non-grinding or off position. Provision is thus made that the operator, for each operation of the mill, will be required to first select a grinding position by operation of the grade selector before the mill can be started, and after the grinding is finished will have to return the grade selector to its off position prior to the stopping of the mill, so that in the next subsequent operation the selector will again have to be adjusted. Because the operator must operate the grade selector for each operation of the mill, he can as readily select the proper grade for each customer, and the objectionable practice of grinding a number of orders without changing the setting of the mill is overcome.

Gate means are also provided for the hopper, the gate being so controlled that coffee in the hopper is not admitted to the grinder until the grinding device has been adjusted to a predetermined position. Thus the coffee is not introduced to the grinding burrs before they are in operation and not until a predetermined grade position has been selected.

The interlock and control means comprises a shaft 70 suitably mounted within the casing section 11 and extending to the outside thereof. On the overhanging end of shaft 70 there is attached the control handle 71. The shaft carries a collar 72 to which there is attached the curved locking finger 73 having a hooked end 74. The locking finger is provided with a suitable aperture for receiving a control link 75 for operating the motor switch 76. The locking finger also carries a pivoted pendant 77, movement of which is confined to a predetermined arc by means of a pin and slot 78, and which is normally urged toward the hooked end 74 by means of spring 79. A spring 80 attached to a fixed part of the mill and to a lever 81 on shaft 70 tends to rotate shaft 70 in such direction as to cause the link 75 to move the motor switch to off position. Shaft 70 is also provided with the shut-off gate 82 adjacent the bottom of hopper 25 which is adapted to control the introduction of the coffee into the grinding burrs.

A member 85 mounted on a fixed portion of the mill serves as a guide for a longitudinally movable arm 86. This arm is provided at one end with an angularly extending bar 87 extending toward and adapted to be engaged by the hooked end of finger 73, the arm extending through an apertured boss 88 on member 85 to prevent turning of the arm. Spring 89 tends to normally urge the arm 86 into locking position and toward the grade selector member 30. Arm 86 terminates at the rear of the grade selector 30 and in any grinding or predetermined selected grade position, it is moved outwardly and into locking position with finger 73 by spring 89 as shown in Fig. 6. A cam 90, fixed to the grade selector 30 is adapted to cooperate with the arm 86 when the grade selector is moved to its non-grinding or off position. In such off position the arm is cammed axially away from the grade selector in such manner that the bar 87 clears hook 74, the finger 73 is released, and spring 80 returns motor switch 76, gate 82, and handle 71 to the off position.

The operation of the mechanism for a complete cycle of operations is as follows. Fig. 7 shows the position occupied by the latching parts when both motor switch and grade selector are in off position, and the gate 82 is closed. The arm 86 has been cammed to its innermost position, and any movement of handle 71 toward on position is prevented by contact of pendant 77 with bar 87. Unless therefore the grade selector is operated to a predetermined grade or grinding position, the handle 71 can not be operated to close the motor circuit or to open gate 82. When, however, the grade selector is adjusted to any of its several grinding positions, the cam 90 releases arm 86 which is then moved toward the grade selector, the bar 87 then moving into the dotted line position shown in Fig. 7. In such position the pendant 77 will clear the bar 87 and the handle can be then thrown into the on position, the motor started, the gate 82 opened, and grinding proceed. The parts are then in the position shown in Fig. 6.

At the end of the operation, or when it is desired to stop the mill, the grade selector 30 must first be turned to off position to release hook 74 from locking engagement with bar 87. As soon as the grade selector is turned to off position, arm 86 is cammed to release bar 87 from hook 74, and spring 80 then returns the switch and handle to off position, stopping the mill and closing the gate. Pendant 77 during such operation pivots on its support to clear bar 87, and is returned to normal position by its spring 79. Thus a single operation of the grade selector 30 to off position is effective to stop the mill, but it can not be started again until the grade selector is moved to a predetermined grinding position.

The invention also provides for a very compact structure in which a customer's receptacle, such as a paper bag 92, may be positioned under the discharge outlet for the ground coffee, indicated generally at 93. This outlet is seated within a recess 94 formed in the casing 11 and of suitable size for the reception of a standard receptacle. This discharge is located preferably above the horizontal axis of the grinding burrs, in this way raising the outlet and permitting the use of a higher receptacle 92 without increasing the height of the machine.

Coffee comprises a hard bean portion and a lighter, more flaky, chaff portion, the latter portion in particular usually becoming electrified as a result of the grinding operation. The particles of chaff when electrified tend to segregate from the bean portions, collecting either along the walls of the discharge hopper, or on the walls of the reeciving container. In accordance with the present invention a simple construction is provided which tends to dissipate the electrical charge of the particles and to provide for the discharge thereof in a uniform and non-segregated condition. For this purpose a pressure chamber 95 is provided into which the ground coffee is fed directly from the burrs by suitable means such as the rotating blades 21a. The chamber is preferably provided with an outward taper as shown to prevent packing of the ground coffee therein. The chamber may be relatively elongated so that ground coffee while passing therethrough is compressed and subjected to frictional contact with the walls sufficient to dispel objectionable electrical charge. Alternately the chamber may be relatively short and a yielding confining means provided for maintaining the ground coffee under pressure. For example a door or weighted member 96 may be hingedly mounted at the end of the pressure chamber, tending to fall toward closed position. As the coffee is discharged from the burrs it fills up the pressure chamber, and then forces the door 96 open, falling into the receptacle 92. The weight and mounting of the door are suitably chosen to provide the desired confining and compressing action within the pressure chamber, the tapered character of the chamber preventing packing of the coffee therein. The provision of a pressure chamber filled with ground coffee also serves as a check against the blower action of the rotating burrs, preventing the tendency to blow fine particles of coffee out of the container, a yielding confining member of the character described serving to prevent blowing of the fine particles of the ground coffee during the entire time the mill is in operation.

The invention also provides a light source 100 positioned in the casing behind a transparent opening 101 which is adapted to receive printed matter, for example, advertising or instructional matter with regard to the different methods of making coffee, and the desirability of the different degrees of fineness or the like. Further transparent or translucent opening 102 in the form of an arrow, located on the customer's side of the mill, may also be illuminated by the same light source 100. The light is preferably controlled by the switch 76 so that it is operated simultaneously with the operation of the mill. When a single ended mill is used it may, if desired, be provided with a disk member 103 positioned symmetrically with respect to the grade selector 30.

The invention also provides a double ended mill having the same utility characteristics as described above for the single ended mill. Thus the double ended mill may comprise a plurality of grinding means of the same characteristics, or of a different range of fineness, with provision requiring the adjustment of the grade selector associated with each end of the mill to a predetermined grinding position prior to the operation of that end of the mill.

Figs. 11 to 14 show such an embodiment of the invention. The driving motor 110 is located substantially centrally of the mill housing 111, and is formed with oppositely extending grinding casings 112, 113 adapted to receive the respective grinding mechanism as described above. Each grinder is provided with grade selector means 114 and with a discharge outlet 115. Coffee is supplied to the respective mills by hoppers 116, each having a gate 117 adapted to control the admission of coffee to the mill.

The mill is provided with a pair of shafts 120 extending through the housing and adapted to receive respectively control handles (not shown). On each shaft there is mounted the latching finger 121 having hook 122 and the pivoted pendant 123. Spring 124 fixed to a stationary part of the mill and to lever 125 mounted on shaft 120 tends normally to move the shaft in the direction to operate the motor switch to off position and to close its respective gate 117.

The operating arms 126 are of similar construction and cooperate with the grade selector as described for the single ended mill, permitting the closing of the motor switch and the opening of the gate at either end of the mill only when the grade selector at that end has been adjusted to a predetermined grinding position. The grinding operation at either end being finished, the gate cannot be closed, and the motor switch cannot be opened to stop the mill until after the associated grade selector means is moved to its off position.

The motor switch 130 is adapted to be operated by the links 131, one attached to the upper and the other to the lower side of its respective latching finger 121. Each link carries a member 132 having elongated slot 133, adapted to engage the switch arm 134. Spring 135 tends to move the switch arm to off position, and the arm may be moved to on position by either one of the links 131.

From the above it will be clear that when either grade selector is moved to a predetermined grinding position, the associated operating handle may then be moved to cause rotation of shaft 120 to in turn cause the link 131 to pick up the switch arm 134, to close the motor switch. Such for instance is the case as shown in the right hand portion of Fig. 12. Simultaneously with such operation the corresponding gate 117 is opened to permit entry of the coffee into its associated mill. Similar operation occurs when the opposite mill is used, thereby providing for the operation and control of the mill from either end, but requiring that in either case the grade selector be operated to a predetermined grinding position as a condition precedent to the closing of the motor switch and the opening of the hopper gate.

Light means are preferably provided for illuminating advertising matter or the like, such light means being shown at 140, controlled by the motor switch 130 so as to be lighted when either end of the mill is in operation. The mill also preferably has additional light sources 136, associated with translucent openings 137 in the mill in the form of arrows pointing toward the end of the mill in operation. Such light sources are controlled by means of dogs 138 formed on the lower end of lever 125, and adapted to operate auxiliary control switches 139 in the respective light circuits, in response to the operation of the respective control shafts 120, thereby providing for the illumination of the light source 136 associated with either or both ends of the mill in operation.

While the forms of apparatus herein described constitute preferred embodiments of the invention, it is to be understood that the invention is not limited to these forms of apparatus, and that changes may be made therein without departing from the scope of the invention which is defined in the appended claims.

What is claimed is:

1. A coffee mill of the character described comprising a hopper for receiving the coffee to be ground, grinding means, a motor for operating said grinding means, a motor switch, movable control means for said switch, grade selector means operable to a plurality of grade selecting positions, interlocking means preventing movement of said control means to close said motor switch until after said grade selector means is operated to one of said plurality of grade selecting positions.

2. A coffee mill of the character described comprising a hopper for receiving the coffee to be ground, grinding means, a motor for operating said grinding means, a motor switch, grade selector means for adjusting said grinding means to grind to a predetermined grade, and interlock means preventing the closing of said motor switch until the grade selector means is placed in a predetermined grade selected position, and thereafter preventing the opening of said motor switch until said grade selector means is operated to a predetermined off position.

3. A coffee mill of the character described comprising a hopper for receiving the coffee to be ground, grinding means, a motor for operating said grinding means, control means for said motor, grade selector means associated with said grinding means, said grade selector means being operable to an off position and to a plurality of grinding positions for different selective grades, and interlock means requiring the operation of said grade selector means to one of said grinding positions as a condition precedent to the operation of said motor, and thereafter requiring the operation of said grade selector means to said off position as a condition precedent to stopping the operation of said motor.

4. A coffee mill of the character described comprising a hopper for receiving the coffee to be ground, a gate for controlling the outlet of coffee from said hopper, grinding means adapted to receive the coffee from said hopper to grind the same, a motor for operating said grinding means, grade selector means associated with said grinding means for adjusting the grade to which the coffee is ground, means for energizing said motor and opening said gate to introduce the coffee from said hopper to said grinding means, and interlock means for preventing the operation of said motor and introduction of coffee to the grinding means until said grade selector means has been adjusted to a predetermined selected grade position.

5. A double ended coffee mill of the character described comprising a pair of grinding means, a motor for operating both of said grinding means, grade selector means associated with each of said grinding means operable to an off position and to a plurality of grade selecting positions, means for controlling the operation of said motor from either end of said mill, and interlocking means providing for the control of said motor by either of said control means only when the grade selector means at the same end of said mill has been operated to a predetermined grade selected position.

DAVID A. MEEKER.